US007260093B1

(12) United States Patent
Goldhammer et al.

(10) Patent No.: US 7,260,093 B1
(45) Date of Patent: Aug. 21, 2007

(54) TIME-SLOT INTERCHANGE SWITCHES HAVING GROUP-BASED OUTPUT DRIVE ENABLE CONTROL AND GROUP-BASED RATE MATCHING AND OUTPUT ENABLE INDICATION CAPABILITY

(75) Inventors: Alexander P. Goldhammer, Brookline, MA (US); Angus David Starr MacAdam, Atlanta, GA (US); Frank Matthews, Alpharetta, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 1155 days.

(21) Appl. No.: 10/324,549

(22) Filed: Dec. 20, 2002

Related U.S. Application Data (63) Continuation-in-part of application No. 10/314,032, filed on Dec. 6, 2002.

(51) Int. Cl.
*H04Q 11/00* (2006.01)
(52) U.S. Cl. ...................................... 370/376; 370/378
(58) Field of Classification Search ................ None
See application file for complete search history.

(56) References Cited

U.S. PATENT DOCUMENTS

| 4,093,827 A | 6/1978 | Charransol et al. ..... 179/15 AT |
| 4,160,127 A | 7/1979 | Siana et al. |
| 4,510,597 A | 4/1985 | Lewis .......................... 370/66 |
| 4,759,010 A | 7/1988 | Murata et al. ................. 370/58 |
| 4,759,012 A | 7/1988 | Suzuki ........................ 370/66 |
| 4,805,172 A | 2/1989 | Barbe et al. ............... 370/68.1 |
| 4,860,281 A | 8/1989 | Finley et al. .................. 370/15 |
| 4,905,226 A | 2/1990 | Kobayashi .................... 370/66 |
| 5,014,268 A | 5/1991 | Tyrrell et al. |
| 5,060,227 A | 10/1991 | Finley et al. ................. 370/79 |
| 5,381,406 A | 1/1995 | Yamashita .................. 370/58.2 |
| 5,521,928 A | 5/1996 | Worsley et al. ............... 370/67 |
| 5,559,796 A | 9/1996 | Edem et al. |
| 5,621,720 A | 4/1997 | Bronte et al. .................. 370/13 |
| 5,841,771 A * | 11/1998 | Irwin et al. .................. 370/360 |
| 5,867,496 A | 2/1999 | Peres et al. |
| 6,049,540 A | 4/2000 | Chrin et al. |
| 6,067,296 A | 5/2000 | Heering et al. ............. 370/363 |
| 6,160,807 A | 12/2000 | Zdenek et al. .............. 370/376 |

(Continued)

OTHER PUBLICATIONS

IDT Data Sheet, 3.3 Volt Time Slot Interchange Digital Switch, 128×128, Jan. 2001, 11 pages.

(Continued)

*Primary Examiner*—Andrew C. Lee
(74) *Attorney, Agent, or Firm*—Myers Bigel Sibley & Sajovec PA (57) ABSTRACT

Time-slot interchange (TSI) switches include an input buffer that is configured to receive at least first and second groups of serial input data streams and an output driver that is configured to generate at least first and second groups of serial output data streams. A control circuit is also provided. This control circuit is electrically coupled to the input buffer and output driver. The control circuit is configured to provide programmable group-based output drive enable control to the at least first and second groups of serial output data streams that is independent of per-channel output stream programming. This per-channel output stream programming is defined by mode bits within the switch's connection memory.

7 Claims, 10 Drawing Sheets

U.S. PATENT DOCUMENTS

| | | | |
|---|---|---|---|
| 6,178,184 B1 | 1/2001 | Petty | 370/503 |
| 6,226,288 B1 | 5/2001 | Allen | 370/376 |
| 6,259,703 B1 | 7/2001 | Gray | 370/458 |
| 6,324,176 B1 | 11/2001 | Bodnar et al. | 370/376 |
| 6,870,831 B2 * | 3/2005 | Hughes et al. | 370/352 |
| 6,879,603 B1 * | 4/2005 | Koenig et al. | 370/535 |
| 6,931,022 B1 * | 8/2005 | Sanders et al. | 370/442 |
| 2001/0038613 A1 | 11/2001 | Gray | 370/258 |
| 2002/0001305 A1 * | 1/2002 | Hughes et al. | 370/369 |
| 2004/0017697 A1 * | 1/2004 | Matthews et al. | 365/189.07 |
| 2004/0047367 A1 * | 3/2004 | Mammen | 370/472 |

OTHER PUBLICATIONS

IDT Data Sheet, 3.3 Volt Time Slot Interchange Digital Switch, 128×128, Aug. 2001, 20 pages.

IDT Data Sheet, Time Slot Interchange Digital Switch, 2,048×2,048, Jul. 2001, 27 pages.

IDT Data Sheet, 3.3 Volt Time Slot Interchange Digital Switch, 512×512, Aug. 2001, 24 pages.

IDT Data Sheet, 3.3 Volt Time Slot Interchange Digital Switch, 4,096×4,096, Jan. 2002, 21 pages (Admitted Prior Art).

Zarlink Semiconductor, Application Note MSAN-123, The MT8980 and the MT8981 Digital Crosspoint Switches, Issue 1, Jun. 1986, pp. A-105 through A-114.

Zarlink Semiconductor, Application Note MSAN-129, Time Space Switching 8,16 or 32 kbps, Channels suing the MT8980, Issue 1, Apr. 1987, pp. 1-4.

Zarlink Semiconductor. TDM to Packet Processors, Data Sheet, Issue 1, Oct. 2002, pp. 1-85.

Agere Systems, TSI-8 Time-Slot Interchanger, Jul. 2002, 2 pages.

Agere Systems, TSI-8 Time-Slot Interchanger, Product Description, May 2002, 7 pages.

Agere Systems, TSI-8 Time-Slot Interchanger, Register Description, May 2002, 33 pages.

Agere Systems, TSI-8 Time Slot Interchanger, Hardware Design Guide, May 2002, 25 pages.

IDT 3.3 Volt Time Slot Interchange, Digital Switch, 16,384×16,384, IDT72V71660, Aug. 2002, 30 pages (Admitted Prior Art).

IDT 3.3 Volt Time Slot Interchange, Digital Switch, 8,192×8,192, IDT72V71650, Aug. 2002, 27 pages (Admitted Prior Art).

IDT 3.3 Volt Time Slot Interchange, Digital Switch, 16,384×16,384, IDT72V73260, Aug. 2002, 27 pages (Admitted Prior Art).

IDT 3.3 Volt Time Slot Interchange, Digital Switch, 8,192×8,192, IDT72V73250, Aug. 2002, 23 pages (Admitted Prior Art).

\* cited by examiner

TIME-SLOT INTERCHANGE SWITCHES HAVING GROUP-BASED OUTPUT DRIVE ENABLE CONTROL AND GROUP-BASED RATE MATCHING AND OUTPUT ENABLE INDICATION CAPABILITY

REFERENCE TO RELATED APPLICATION

This application is a continuation-in-part (CIP) of U.S. application Ser. No. 10/314,032, filed Dec. 6, 2002, entitled "Time-slot Interchange Switches Having Efficient Block Programming and On-chip Bypass Capabilities and Methods of Operating Same," assigned to the present assignee, the disclosure of which is hereby incorporated herein by reference.

FIELD OF THE INVENTION

The present invention relates to integrated circuit devices and methods of operating same, and more particularly to integrated circuit switches that receive and transmit serial data streams and methods of operating same.

BACKGROUND OF THE INVENTION

Figure 1:
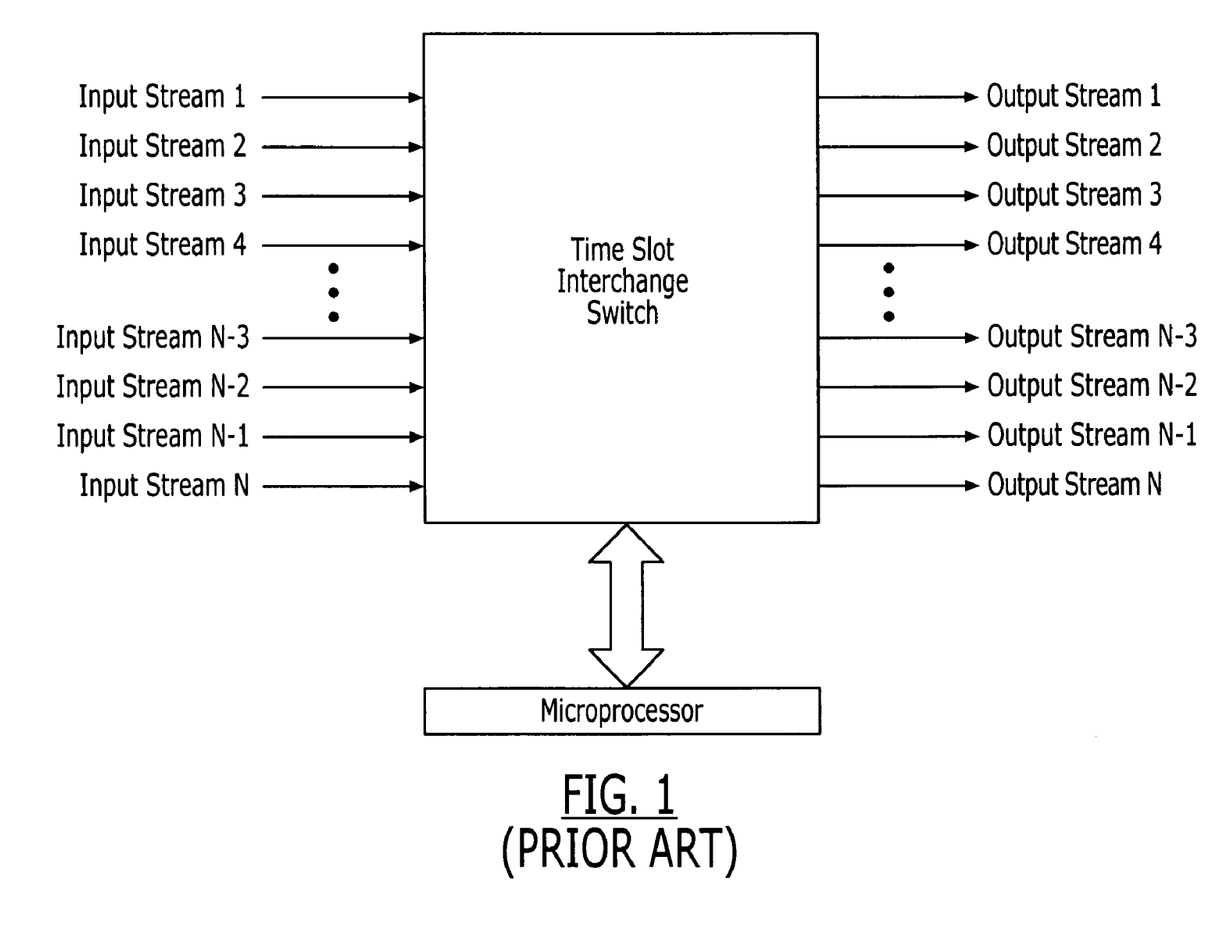
FIG. 1 is a block diagram of a conventional time-slot interchange (TSI) switch.
Figure 2A:
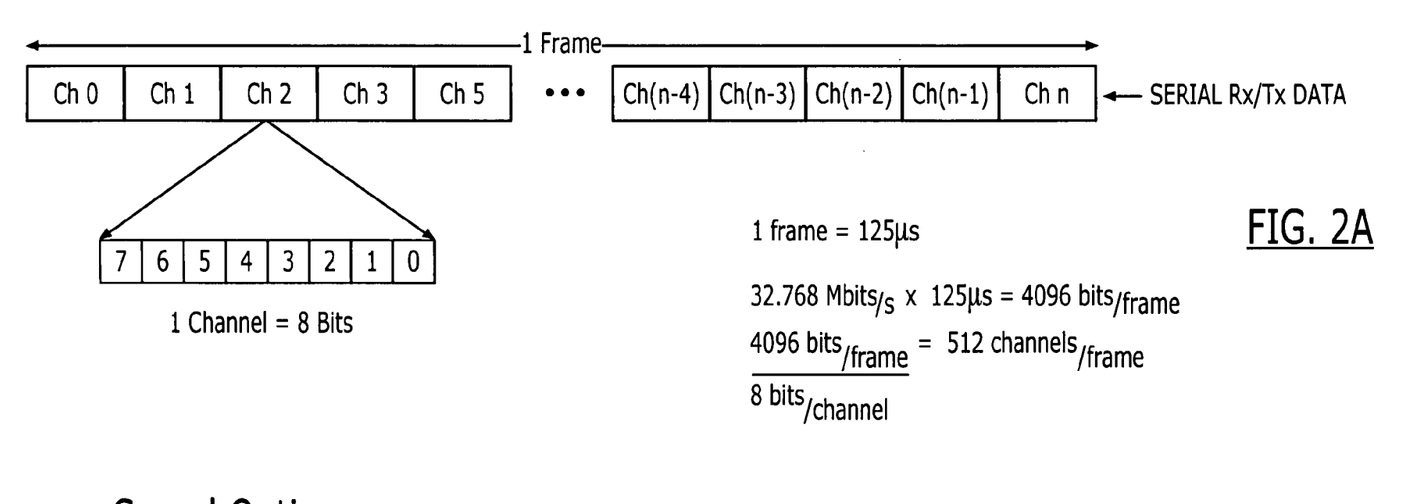
FIG. 2A illustrates a serial data stream having a plurality of data channels therein.
Figure 3:
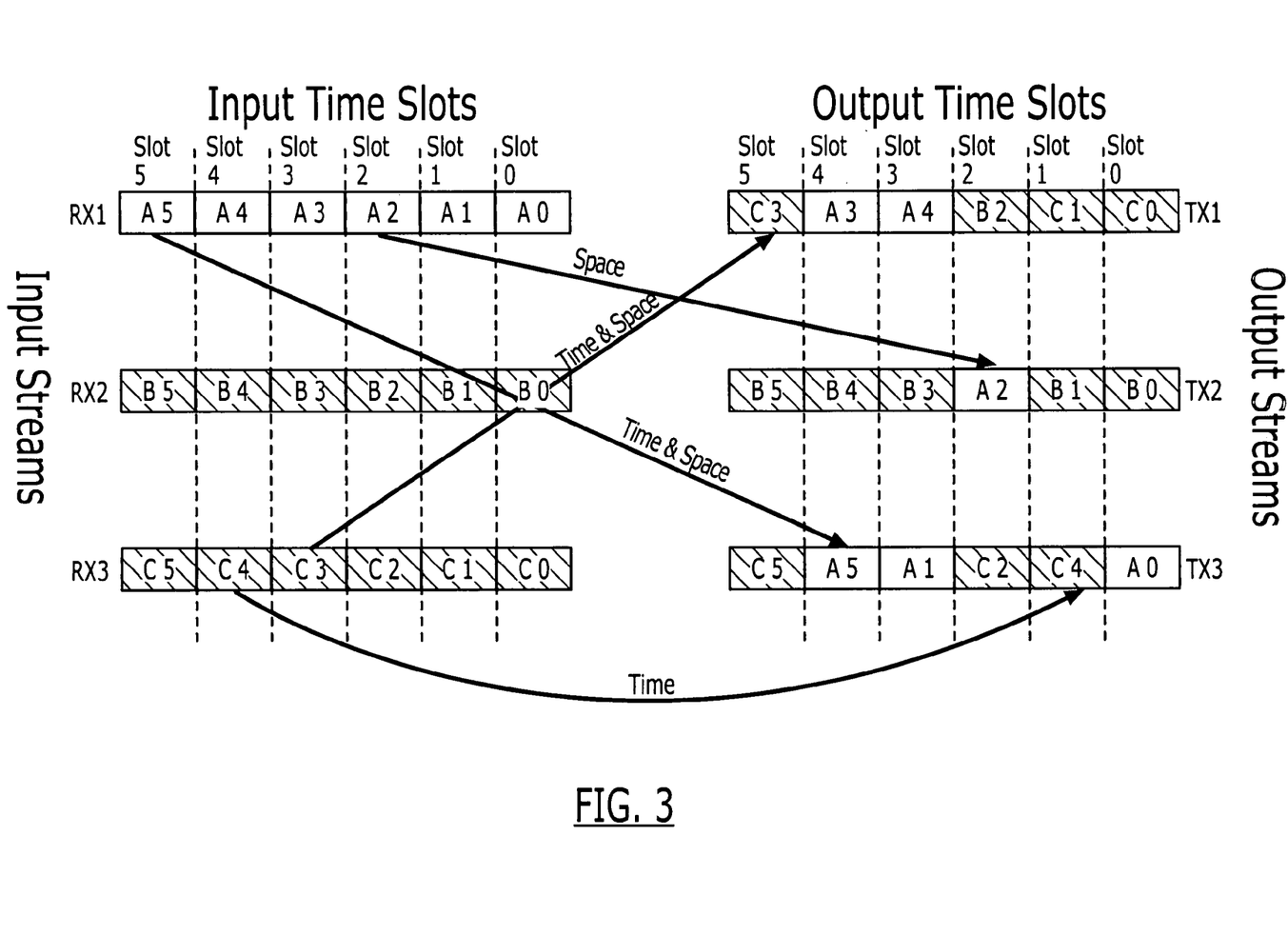
FIG. 3 illustrates conventional time-slot interchange operations that may be performed using TSI switches.

Conventional time-slot interchange (TSI) switches utilize both data and connection memories to control routing of a plurality of input and output data streams. As illustrated by FIGS. 1 and 2A, a conventional TSI switch may be operated under microprocessor control and each input data stream (RX) and output data stream (TX) may be configured as a serial stream of multi-bit (e.g., 8-bit) channels that are partitioned into fixed-duration frames. These multi-bit channels may be multiplexed in time and/or space between any one of a plurality of the input data streams and output data streams, as illustrated by FIG. 3. Conventional TSI switches are disclosed by U.S. Pat. Nos. 4,510,597 and 6,259,703 to Mitel Corporation. In sub-rate switching applications, 1-bit, 2-bit and 4-bit channels may be provided.

A TSI switch typically enables a user to perform manual microprocessor-based programming of individual connection memory entries with data memory addresses and switching mode data when the switch is actively processing serial data streams. Such manual operations may be time consuming and require substantial microprocessor bandwidth. The performance of conventional test and debugging operations on downstream elements in a communication path may also be complicated by the presence of a TSI switch in the path. In particular, to enable test and debugging operations to be performed on downstream elements, it may be necessary to set the TSI switch into a one-to-one RX-to-TX routing mode with constant delay. Unfortunately, this routing mode inherently results in multiple frames of delay through the TSI switch during debugging.

Conventional TSI switches may also provide global or per-channel high-impedance (high-Z) output control associated with the output data streams (TX). For example, output enable (OE) bits within a connection memory (CM) of the TSI switch may be set to provide per-channel high-impedance output control. Global high-impedance output control of all output data streams may be provided by an output drive enable (ODE) pin of the TSI switch. This pin may operate in conjunction with an output standby (OSB) bit within a control register (CR) in the TSI switch. These conventional per-channel and global high-Z control features are more fully illustrated below in Table 1.

TABLE 1

| OE bit in CM | ODE pin | OSB bit in CR | TX Stream Output Status |
|---|---|---|---|
| 0 | Don't Care | Don't Care | Per-Channel High-Z |
| 1 | 0 | 0 | Global High-Z |
| 1 | 0 | 1 | TX Enabled |
| 1 | 1 | 0 | TX Enabled |
| 1 | 1 | 1 | TX Enabled |

Notwithstanding these TSI switches, there continues to be a need for switches that can be programmed and operated more efficiently and facilitate more efficient testing and debugging operations.

SUMMARY OF THE INVENTION

Time-slot interchange (TSI) switches according to embodiments of the present invention include a data memory having first entries therein that contain serial data received by the switch and a connection memory having second entries therein. When programmed, these second entries contain addresses of a plurality of the first entries in the data memory and switching modes that have been assigned to the plurality of the first entries. These switching modes may be defined by two bits that specify one of four switching modes (a variable delay mode, a constant delay mode, a processor mode and an output high impedance mode). A control circuit is also provided. This control circuit is configured to automatically program a block of the second entries in the connection memory with updated switching modes during an efficient burst program mode of operation. The block may be referred to as a "group" block (i.e., a block within a group of entries). This burst program mode of operation may be commenced by setting a block program enable bit within a control circuit storage element when the switch is actively processing serial input streams. During the burst program mode of operation, the output data is guaranteed to be valid.

The control circuit may include a first programmable register that retains a starting address of the block of the second entries and a second programmable register that retains an ending address of the block of the second entries. These registers are accessed by command logic upon commencement of the burst program mode of operation. The starting address may include a group address (e.g, Group 0-7), a starting stream address (e.g., Stream 0-7) and a starting channel address (Channel 0-511) and the ending address may include an ending stream address and an ending channel address within the group identified by the group address. In alternative embodiments, a block spanning multiple groups and/or multiple blocks may be automatically programmed during a burst program mode of operation that is commenced while the switch is active. Moreover, during the burst program mode of operation, one channel of all streams in the "group" block is programmed before moving to the next channel. Thus, the group block programming is performed in a column-to-column fashion not a row-to-row fashion. This form of group block programming is advantageous because it makes it more difficult for the TSI switch to "catch up" with the group block programming when the switch is actively processing data streams.

The control circuit may include a control register that retains, among other things, the updated switching modes used by the control circuit during the burst program mode of operation. In particular, a two-bit switching mode designation may be read from the control register and automatically programmed into each entry within the designated block. The control circuit may also include command logic and a block program address comparator and address counter that perform many of the operations during the burst program mode.

TSI switches according to other embodiments of the present invention include an input buffer that is configured to receive a plurality of streams of serial input data and a data memory having a plurality of first entries therein that retain the received input data. A serial-to-parallel (S-to-P) converter is also provided to convert the serial input data received by the input buffer into parallel data that is loaded into the data memory. A connection memory is provided having second entries therein that are configured to retain addresses of the plurality of the first entries in the data memory and switching modes assigned to the plurality of the first entries. These switching modes establish per-channel modes, such as the variable delay mode, the constant delay mode, the processor mode and the output high impedance mode. If three or more mode bits are used, then additional modes, such as a pseudo-random bit sequence mode, may be designated during block programming. A parallel-to-serial (P-to-S) converter is also provided. This P-to-S converter is configured to convert parallel data read from the data memory into serial output data that is provided to an output buffer/driver that generates the serial output streams. A control circuit is provided to automatically program a block of the second entries in the connection memory with updated switching modes during a burst program mode of operation. The control circuit may also be configured to reset connection memory entries (e.g., bits 0-14) during the burst program mode of operation.

Further embodiments of the present invention include a TSI switch that is configured to internally support burst programming of connection memory and serial input-to-output bypass of data memory when disposed in a burst program mode of operation and a bypass mode of operation, respectively. In these embodiments, an input multiplexer may be provided that can direct serial input data provided by an input buffer to an internal serial bypass bus, in response to an active bypass control signal. An output multiplexer may also be provided that can direct the serial input data on the internal serial bypass bus to the output buffer, in response to the active bypass control signal. This bypass control signal may be responsive to a bypass bit (BYP) stored within a control register.

Embodiments of the present invention may also include methods of operating a TSI switch. These methods may include burst-programming a block of connection memory entries with equivalent switching modes selected from the group consisting of a variable delay mode, a constant delay mode, a processor mode and an output high impedance mode. The methods may also include internally bypassing data memory in the switch by routing serial data received by an internal input buffer directly to an internal output buffer/driver, without performing a serial-to-parallel conversion (or data memory storage) operation on the serial data.

TSI switches according to still further embodiments of the present invention include an input buffer that is configured to receive at least first and second groups of serial input data streams and an output driver that is configured to generate at least first and second groups of serial output data streams. A control circuit is also provided. This control circuit is electrically coupled to the input buffer and the output driver. The control circuit is configured to provide programmable group-based output drive enable control (i.e., high-impedance (high-Z) or low-impedance (low-Z)) to the at least first and second groups of serial output data streams, which is independent of conventional per-channel output stream programming. This per-channel output stream programming is typically defined by mode bits within a connection memory. According to a preferred aspect of these embodiments, a transmit data rate selection register (TX-DRSR) is provided. This register is configured to retain output drive enable data that specifies which ones of the at least first and second groups of serial output data streams are disposed in high-Z states and which other ones are disposed in low-Z (active) states when the TSI switch is active. The bypass operations described above preferably support group-based and global output drive enable control (i.e., group-based or global high-impedance output control).

According to still further preferred aspects of these embodiments, the control circuit may also be configured to support processing of the first and second groups of serial input data streams at different receive data rates and processing of the first and second groups of serial output data streams at different transmit data rates. In this case, the transmit data rate selection register (TX-DRSR) is further configured to retain data that specifies the transmit data rates on a group-by-group basis. The data retained by the transmit data rate selection register may also specify which groups of the serial output data streams operate in an output enable indication (OEI) mode. For example, in some embodiments, four bits of data may be specified for each group of serial output data streams. With respect to a particular group of serial output data streams, one bit of the four bits may specify whether the entire group is in a high-Z state or a low-Z state and three of the four bits may specify the transmit data rate or indicate that the particular group (e.g., odd group) of serial output data streams is to operate in an OEI mode relative to another active group (e.g., even group) of serial output data streams. A receive data rate selection register may also be provided. This receive data rate selection register can be configured to retain data that specifies the receive data rates on a group-by-group basis.

Embodiments of the present invention may also include an input buffer that is configured to receive at least first through fourth equal-sized groups of serial input data streams and an output driver that is configured to generate at least first through fourth equal-sized groups of serial output data streams. In these embodiments, the control circuit is configured to support processing of the first through third groups of serial output data streams at different transmit data rates and is further configured to support operation of the fourth group of serial output data streams in an OEI mode that is matched in frequency to the transmit data rate of a corresponding one of the first through third groups of serial output data streams.

DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Signal lines and signal pins and signals thereon may be referred to by the same reference characters. Like numbers refer to like elements throughout. Signals may also be synchronized and/or undergo minor boolean operations (e.g., inversion) without being considered different signals. The suffix B (or prefix symbol "/") to a signal name may also denote a complementary data or information signal or an active low control signal, for example. Numeric and size values for various components of the preferred embodiments are also provided for purposes of illustration only and should not be used to limit the scope of the illustrated embodiments or claims.

Figure 2B:
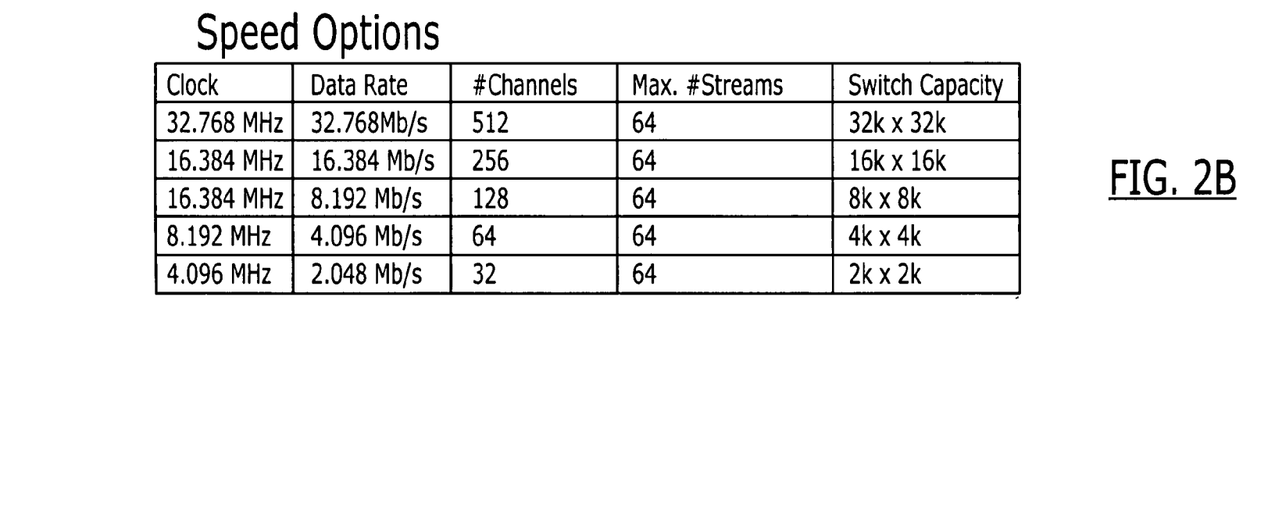
FIG. 2B illustrates speed options that are available with TSI switches according to some embodiments of the present invention.
Figure 4:
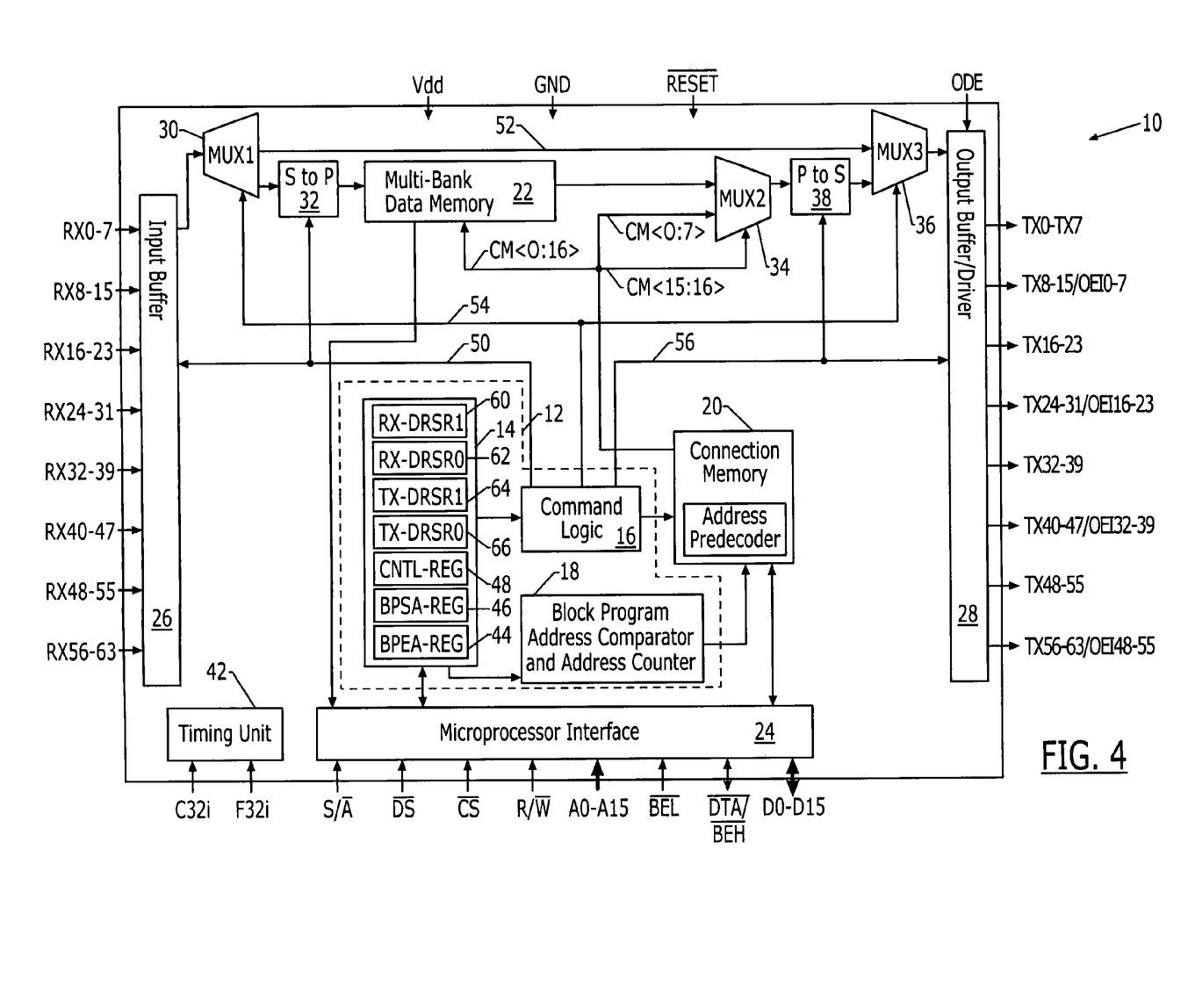
FIG. 4 is a block diagram of a TSI switch according to an embodiment of the present invention.

Referring now to FIG. 4, a time-slot interchange (TSI) switch 10 according to an embodiment of the present invention will be described. The TSI switch 10 includes a timing unit 42 that is responsive to a clock signal C32i. To achieve the speed options illustrated by FIG. 2B, the clock signal C32i may have a frequency of 32.768 MHz. The timing unit 42 also has a frame pulse input F32i, which accepts and automatically identifies frame synchronization signals formatted according to ST-BUS and GCI specifications.

A microprocessor interface circuit 24 is also provided. A plurality of pins are provided to enable connection between the interface circuit 24 and an external data processing unit. This data processing unit may constitute a microprocessor, program logic device (PLD) or field programmable gate array (FPGA), for example (see, e.g., FIG. 1). These pins and signals thereon include a synchronous/asynchronous bus mode signal S/A, which selects between asynchronous bus timing and synchronous bus timing. In a synchronous mode, a data transfer acknowledgment/byte enable high signal ((/DTA)/(/BEH)) acts as a /BEH signal/pin and is used in conjunction with a byte enable low signal/pin /BEL to output data onto a data bus (D0-D15). In an asynchronous mode, the byte enable low signal/pin /BEL is held low and the data transfer acknowledgment/byte enable high signal/pin acts as the data bus acknowledgment output. The signal/pin /DS represents a data strobe input. When the signal /DS is active at a low level, it operates in conjunction with a chip select signal /CS to enable read and write operations. The read/write signal/pin R/(/W) controls the direction of the data bus lines D0-D15 during a microprocessor access, and the address lines A0-A15 access all internal memories. In the synchronous mode, the byte enable low signal /BEL will enable the lower byte (D0-D7) onto the data bus. The data transfer acknowledgment/byte enable high signal/pin ((/DTA)/(/BEH)) also indicates that a data bus transfer is complete. When the bus cycle ends, this signal/pin switches high and then tri-states, allowing for faster bus cycles with a weaker pull-up resistor. A pull-up resistor is required to hold a high level when the pin is tri-stated. When the device is in synchronous bus mode, the ((/DTA)/(/BEH)) signal/pin acts as an input and will enable the upper byte (D8-D15) onto the data bus. The signals Vdd and GND represent power supply and ground reference voltages, respectively, and the signal /RESET represents an active low reset signal. This active low reset signal puts the switch 10 in its reset state that clears the internal counters and registers and brings outputs TX0-TX63 to high-impedance states.

The TSI switch 10 is illustrated as receiving 64 serial input data streams (shown as RX0-RX63) and generating 64 serial output data streams (shown as TX0-TX63). An explained more fully hereinbelow, when an output enable indication (OEI) function is selected for a given odd group of output lines (i.e., TX8-15/OEI0-7, TX24-31/OEI6-23, TX40-47/OEI32-39 or TX56-63/OEI48-55), then the selected odd group of output lines will reflect the active or high-impedance status for its corresponding even group of output lines (i.e., TX0-7, TX16-23, TX32-39 and TX48-55). The serial input data streams are received by an input buffer 26, which may be of conventional design. The input buffer 26 is configured to pass the received input data to a serial-to-parallel converter 32. This serial-to-parallel converter 32 provides a data memory 22 with parallel data (e.g., 8 bits of data corresponding to each channel of data received on each of the serial input data streams RX0-RX63). The input buffer 26 and converter 32 may be configured to perform automatic frame alignment, as described more fully described in commonly assigned U.S. application Ser. No. 09/858,410, filed May 16, 2001, the disclosure of which is hereby incorporated herein by reference.

Figure 5A:
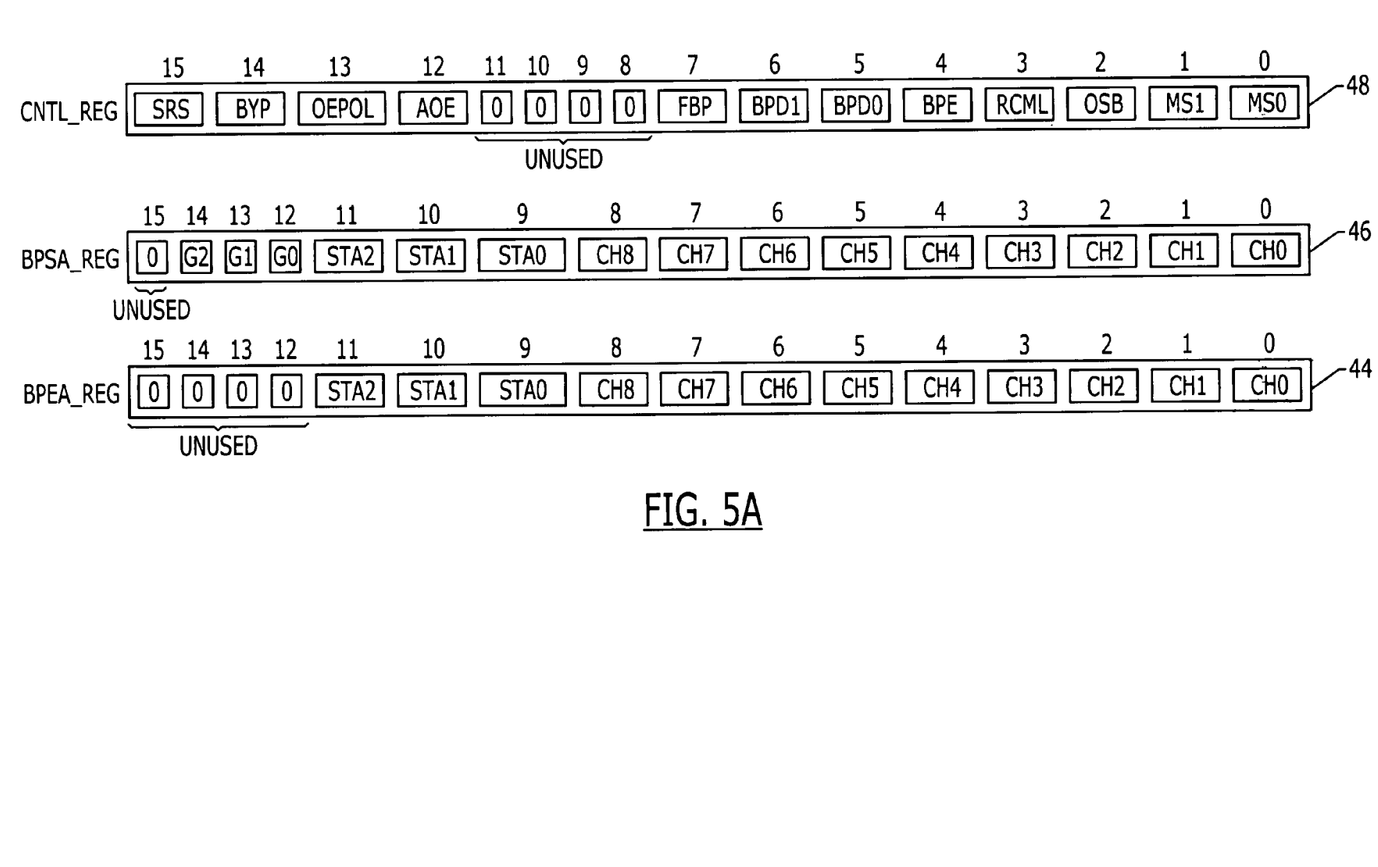
FIG. 5A illustrates a plurality of registers within the TSI switch of FIG. 4.

According to a preferred aspect of the illustrated TSI switch 10, an input multiplexer 30 (MUX1) is provided between the input buffer 26 and the serial-to-parallel converter 32. The input multiplexer 30 is configured to direct serial input data from the input buffer 26 to a serial bypass bus 52 when the TSI switch 10 is operating in a bypass mode of operation. This bypass mode of operation facilitates testing and debugging of downstream elements in a communications path by making the TSI switch 10 essentially transparent during testing/debugging. This serial bypass bus 52 may have a width that is equivalent to the number of input data streams (e.g., 64) received by the input buffer 26. The input multiplexer 30 is responsive to a bypass control signal 54 generated by a control circuit 12. This control circuit may be configured to include a storage element that retains a bypass bit (BYP). As illustrated by FIG. 5A, the storage element may represent bit position 14 within a control register 48. When bit position 14 is set (e.g., BYP=1), then the bypass control signal 54 is active and the input multiplexer 30 operates to direct the serial input data from the input buffer 26 to the serial bypass bus 52. However, when bit position 14 is not set, the bypass control signal 54 is inactive and the input multiplexer 30 operates to direct the serial input data from the input buffer 26 to the serial-to-parallel converter 32.

The serial bypass bus 52 is connected to an input of an output multiplexer 36. The output multiplexer 36 (MUX3) is responsive to the bypass control signal 54 generated by the control circuit 12. When the bypass control signal 54 is active, the output multiplexer 36 operates to pass serial data from the serial bypass bus 52 to an output buffer/driver 28 that generates the serial output data streams TX0-TX63. The output buffer/driver 28 is responsive to an output drive enable (ODE) signal which provides global ODE control. When the ODE signal is low and the output standby (OSB) bit of a control register 48 (see, FIG. 5A) is low, then all the TX outputs TX0-TX63 of the output buffer/driver 28 are disposed in high-impedance states (i.e., disabled). However, if the ODE signal is high, the TX outputs are enabled. Nonetheless, each channel provided at a TX output may still be put into a high-impedance state by using the per-channel control bit in a connection memory 20 (see, e.g., bits 15-16 in the highlighted row in FIG. 5B)), as described more fully hereinbelow. During bypass mode, bits CM<15:16> of the connection memory space are ignored and per-channel high-impedance outputs are not possible. Nonetheless, group-based high impedance output control (and global output high impedance control using the ODE pin) is possible.

The data memory 22 is configured to provide data directly to a microprocessor interface circuit 24 and an input of a multiplexer/state machine 34 (MUX2). This multiplexer/state machine 34, which may be similar in design to those in conventional TSI switches, performs state machine and time-division multiplexing functions. These functions of providing data to the microprocessor interface circuit 24 and the multiplexer/state machine 34 are conventional within TSI switches and need not be described further herein. The data memory 22 may be configured to include multiple banks of memory (e.g., banks A, B and C), with each bank having $2^{15}$ (i.e., 32K) 8-bit entries. Each entry is addressable by row addresses (CM<0:14>) that are provided by the connection memory 20. Address compare logic (not shown) is also provided for bank selection. Techniques to generate data memory addresses in TSI switches are more fully described in commonly assigned U.S. application Ser. No. 10/205,177, filed Jun. 25, 2002, the disclosure of which is hereby incorporated herein by reference.

Switching mode bits, which can be read from bit locations CM<15:16> within the connection memory 20, are provided to control terminals of the multiplexer/state machine 34. The connection memory 20 may also provide 2-bits of data (CM<15:16>) that operate to select between banks A, B and C when the data memory 22 is being read. A plurality of connection memory bits, shown as CM<0:7> are also provided as inputs to the multiplexer/state machine 34. During a processor mode of operation, these connection memory bits CM<0:7> represent processor data originally written from the microprocessor interface 24 into the connection memory 20 (see, e.g., processor mode data (PMD) in the highlighted row of connection illustrated in FIG. 5B). An output of the multiplexer/state machine 34 is provided to an input of a parallel-to-serial converter 38. When the output multiplexer 36 (MUX3) is not disposed in a special bypass mode of operation that facilitates testing/debugging, then the output of the parallel-to-serial converter 38 passes through the output multiplexer 36 to the output buffer/driver 28.

The connection memory 20 is coupled by a bidirectional data bus to the microprocessor interface circuit 24 so that processor-based read and write operations may be performed on the connection memory 20. The connection memory 20 operates under control of the control circuit 12. Components of the control circuit 12 that are relevant to its burst program and bypass modes of operation will now be described in detail. The control circuit 12 may also include devices, elements and programmed logic that perform additional functions associated with conventional TSI switches.

The illustrated control circuit 12 comprises internal storage elements and devices, which may take the form of internal registers 14. These internal registers 14 include registers that support a bypass mode of operation and facilitate "group" block programming of the connection memory 20 when the control circuit 12 is operating in a burst program mode of operation. This burst program mode of operation refers to a mode of operation that occurs when the switch 10 is actively processing serial data streams.

The internal registers 14 are illustrated as a control register 48 (CNTL-REG), a block programming starting address register 46 (BPSA-REG) and a block programming ending address register 44 (BPEA-REG). Four additional registers are also provided to enable group-based output drive enable control and, group-based rate matching and output enable indication (OEI) capability, as described more fully hereinbelow. These additional registers include a pair of receive data rate selection registers 60 and 62 (RX-DRSR1 and RX-DRSR0) and a pair of transmit data rate selection registers 64 and 66 (TX-DRSR1 and TX-DRSR0). The contents of these internal registers 14 are more fully illustrated by FIGS. 5A and 6A-6C.

Figure 5B:
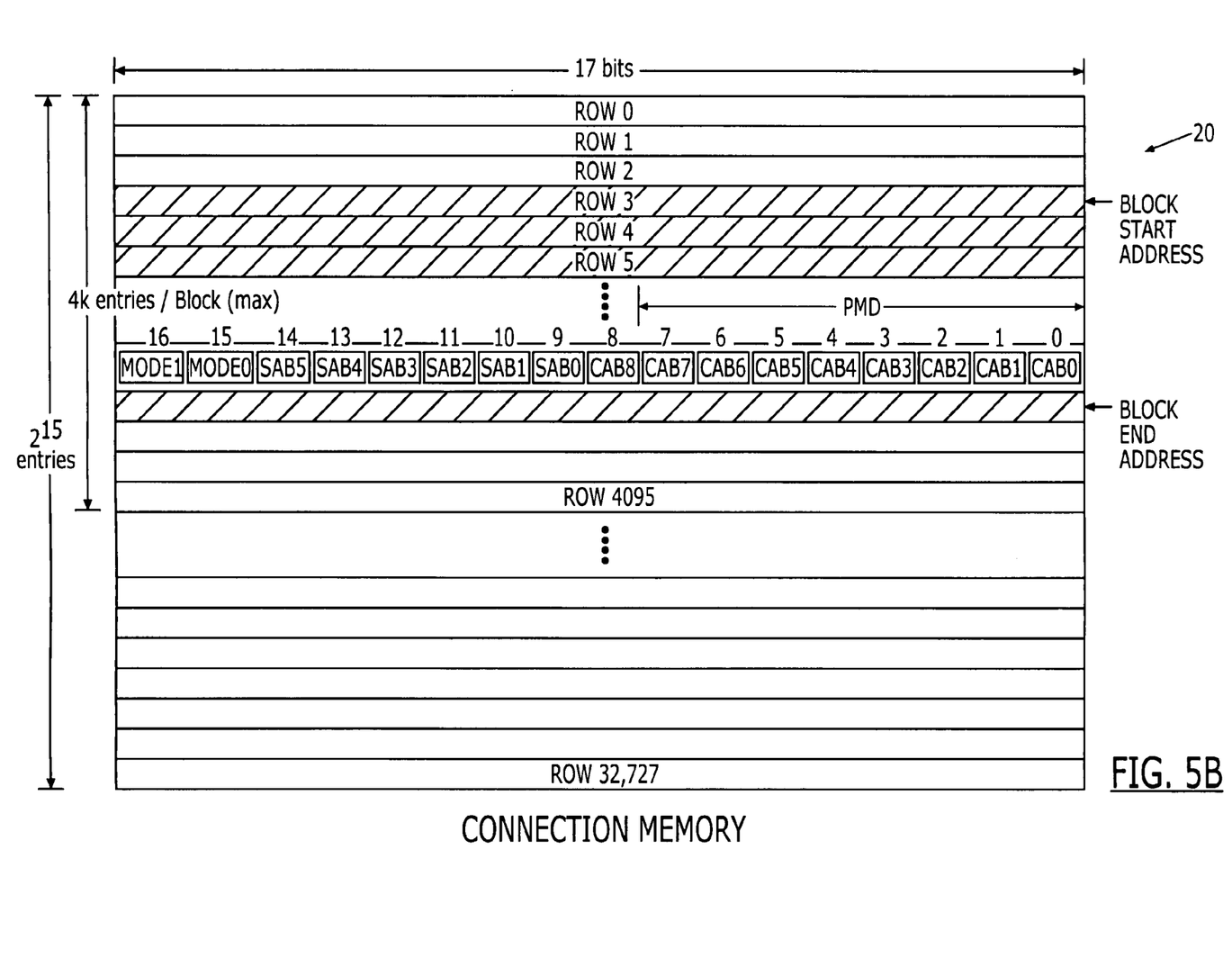
FIG. 5B is a diagram that illustrates entries within the connection memory illustrated by the TSI switch of FIG. 4.

Command logic 16 is provided to perform many of the block programming and bypass operations. The command logic 16 is also configured to provide control signals to the input buffer 26 (and serial-to-parallel converter 32) and output buffer/driver 28 (and parallel-to-serial converter 38), as illustrated by signal lines 50 and 56. The connection memory 20 also includes an address predecoder that receives addresses from an address comparator and counter 18. The address comparator and counter 18 receives a starting write address and an ending write address from the registers 46 and 44. During the burst program mode of operation, a block of entries within the connection memory 20 are automatically written with updated switching mode data, while the switch 10 is actively processing serial data streams and the serial output data streams TX0-TX63 are guaranteed valid. As illustrated by FIG. 5B, the block of entries that receive the updated switching modes, shown as MODE0 and MODE1 at bit positions 15 and 16 in the highlighted row, span a plurality of consecutive rows within a designated group of rows in the connection memory 20. These rows include a "starting" row defined by a block start address held in the starting address register 46 and an "ending" row defined by the block end address held in the ending address register 44. These registers may also include other addresses that enable multiple blocks to be automatically programmed during the burst program mode of operation. Moreover, the command logic 16 is configured so that during the burst program mode of operation, one channel of all streams in the "group" block is programmed before moving to the next channel. Thus, the group block programming is performed in a column-to-column fashion not a row-to-row fashion. This form of group block programming is advantageous because it makes it more difficult for the TSI switch to "catch up" with the group block programming when the switch is actively processing data streams.

In FIG. 5B, the designated group of rows is shown as group 0, which spans rows 0-4095 within the connection memory 20. This connection memory 20 is illustrated as including 32K entries that are 17 bits wide, with each group of entries being defined by a block of 4K entries. As illustrated by the starting address register 46 of FIG. 5A, the block start address includes a group address (G0-G2 at bits 12-14), a starting stream address (STA0-STA2 at bits 9-11) and a starting channel address (CH0-CH8 at bits 0-8). In the ending address register 44, the block end address includes an ending stream address (STA0-STA2 at bits 9-11) and an ending channel address (CH0-CH8 at bits 0-8).

Figure 5C:
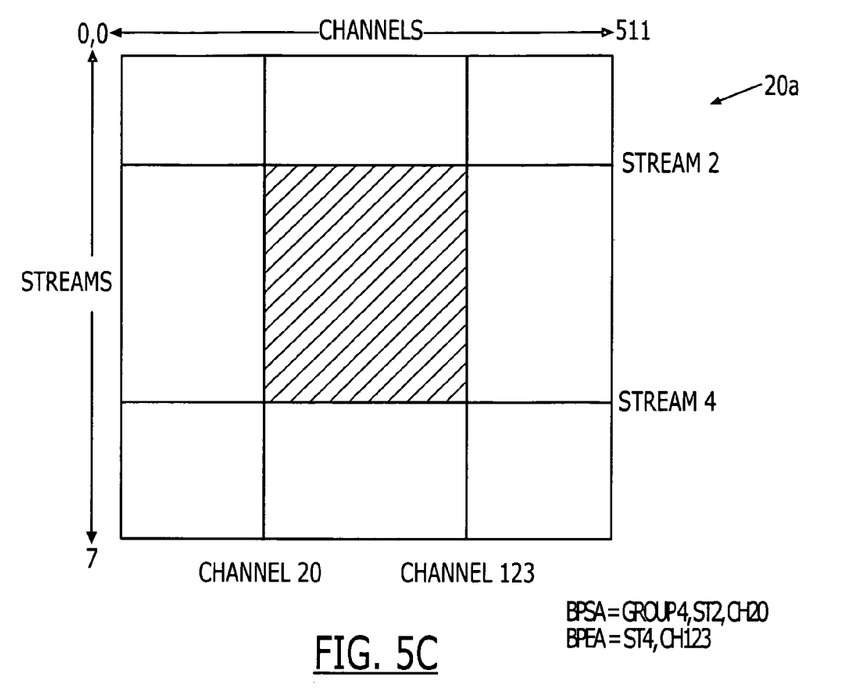
FIG. 5C is a diagram that illustrates a first region within a group of entries within the connection memory of FIG. 5B that can be automatically programmed during a burst program operation.
Figure 5D:
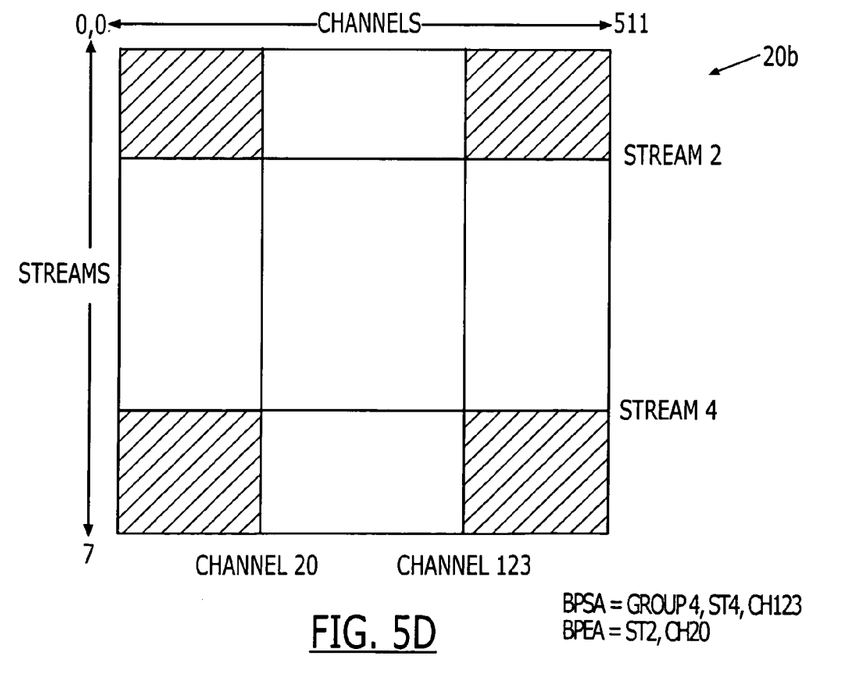
FIG. 5D is a diagram that illustrates a second region within a group of entries within the connection memory of FIG. 5B that can be automatically programmed during a burst program operation.
Figure 5E:
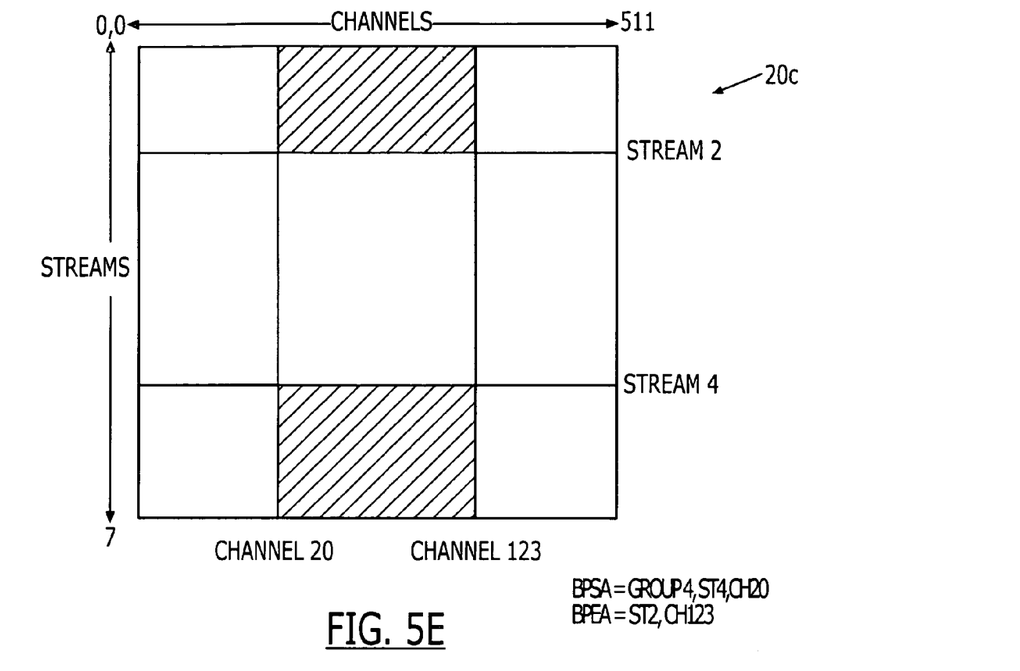
FIG. 5E is a diagram that illustrates a third region within a group of entries within the connection memory of FIG. 5B that can be automatically programmed during a burst program operation.
Figure 5F:
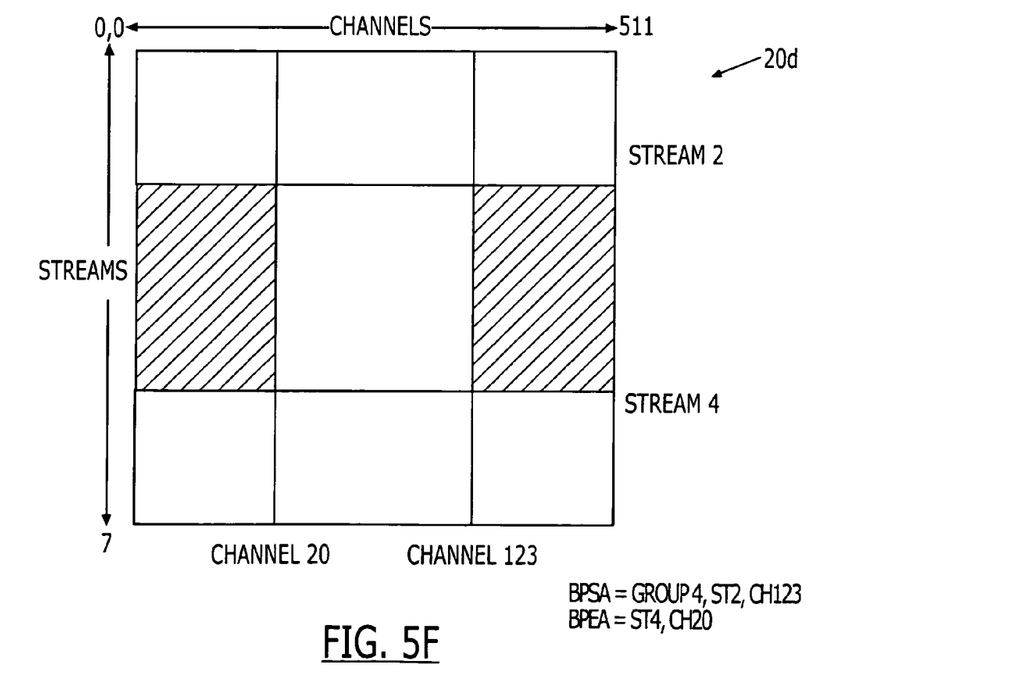
FIG. 5F is a diagram that illustrates a fourth region within a group of entries within the connection memory of FIG. 5B that can be automatically programmed during a burst program operation.

As illustrated by FIG. 5C, the shaded region illustrates a first block of entries within a designated group of connection memory 20a that is automatically programmed with equivalent switching modes during the burst program mode of operation. The shaded region extends from stream 2, channel 20 (starting address) to stream 4, channel 123 (ending address). According to a preferred aspect of the illustrated switch 10, the starting address retained by the starting address register 46 may be larger than the ending address retained by the ending address register 44. If this occurs, the inverse connection memory locations in the given group are programmed and this results in a "wrap-around" effect, which may cover a situation whereby a block spans multiple frames of output data. This can occur when the switch is already part of the way through a frame and the group block is "ahead" of the data that is being transmitted. This "wrap-around" effect is independent for both the stream and channel addresses. For example, in FIG. 5D, the shaded region illustrates a second block of entries within a designated group of connection memory 20b that is automatically programmed with equivalent switching modes during the burst program mode of operation. The shaded region extends from stream 4, channel 123 (starting address) to stream 2, channel 20 (ending address). In FIG. 5E, the shaded region illustrates a third block of entries within a designated group of connection memory 20c that is automatically programmed with equivalent switching modes during the burst program mode of operation. The shaded region extends from stream 4, channel 20 (starting address) to stream 2, channel 123 (ending address). In FIG. 5F, the shaded region illustrates a fourth block of entries within a designated group of connection memory 20d that is automatically programmed with equivalent switching modes during the burst program mode of operation. The shaded region extends from stream 2, channel 123 (starting address) to stream 4, channel 20 (ending address).

In some embodiments, the connection memory 20 of FIG. 4 may be partitioned into (i) a connection memory "low" region having a width of 16 columns that include the fifteen bit positions 0-14 in the highlighted row at columns 0-14 of the low region; and (ii) a connection memory "high" region having a width of 16 columns that include bit positions 15-16 in the highlighted row at columns 0-1 of the high region. Column 15 in the connection memory low region and columns 2-15 in the connection memory high region may be unused. The bit positions 0-14 in the highlighted row of FIG. 5B retain a row address that operates as an address pointer into the data memory 22. This 15-bit row address includes stream address bits and channel address bits (SAB5-SAB0 and CAB8-CAB0). The bit positions 15-16 in the highlighted row retain 2 bits of mode data (MODE0, MODE1). These 2 bits of mode data define one of four possible modes: (0,0)=variable delay mode, (0,1)=processor mode, (1,0)=constant delay mode and (1,1)=output high impedance mode.

The control register 48 of FIG. 5A is illustrated as including 16 bits. Bit positions 0-1 of the control register 48 include two memory select bits (MS0, MS1): (0,0)=connection memory LOW region, (0,1)=data memory, (1,0)=connection memory HIGH region and (1,1)=reserved. Bit position 2 of the control register 48 defines an output standby condition (OSB). When the output drive enable signal ODE=0 and OSB=0, the output drivers associated with outputs TX0-TX63 are disposed in high impedance modes. When either ODE=1 or OSB=1, the output drivers function normally. Bit position 3 (RCML) defines a condition whereby at least a portion of the connection memory low region is set low during either group block programming (i.e., when the control circuit 12 is disposed in a burst program mode of operation) or full block programming. In particular, when RCML=1, all bits 0-14 within the designated block of connection memory 20 (see, FIG. 5B) will be reset to zero during group block programming when the switch 10 is actively processing serial data streams, or during full block programming when the switch 10 is in a start-up mode of operation and not actively processing serial data streams (or is processing data but the data within the serial output data streams does not need to be guaranteed as valid). When RCML=0, bits 0-14 within the designated block will retain their original values during group block programming when the switch is actively processing serial data streams (and the processed data needs to be valid) and during full block programming when the switch is being initialized (or during modes when the output data does not need to be valid).

Bit position 4 (BPE) within the control register 48 establishes whether block programming is enabled or not. In particular, when the command logic 16 detects a low-to-high transition of this bit position (and FBP=0), the control circuit 12 enters a burst program mode of operation which causes a designated block of connection memory 20 (as delimited by the starting and ending addresses within a group) to be automatically programmed. The BPE bit may be set high in response to microprocessor control provided through the microprocessor interface 24. After block programming has been completed, then bit position 4 is reset by the command logic to indicate completion of the burst programming mode of operation. In the illustrated embodiment, bit positions 15 and 16 in the designated block within the connection memory 20 of FIG. 5B (which may be equivalent to bit positions 0 and 1 in a connection memory high region) are automatically programmed with equivalent mode bits during burst programming. The values of these mode bits are established by bit positions 5-6 (BPD0 and BPD1) of the control register 48 (where BPD0→MODE0 and BPD1→MODE1 during burst programming). As described above, one of four possible modes is typically established.

Bit position 7 (FBP) within the control register 48 identifies a conventional full block programming mode of operation whereby the entire connection memory space is programmed. This full block programming mode typically occurs when the switch 10 is inactive (e.g., upon start-up) or the switch is otherwise not actively processing serial data streams in a manner that guarantees validity. In particular, when FBP=1 and BPE switches low-to-high, the starting and ending address values within registers 46 and 44 are ignored and the full connection memory space (i.e., all 32K entries) is programmed with equivalent mode bits. When FBP=0, the starting and ending address values specify the extent of a block within a designated group that is automatically programmed during a group block programming.

Bit positions 8-11 of the control register 48 are unused in the illustrated embodiment. When bit position 12 (AOE) is set high for all output enable mode, all output stream pins TX0-TX63 become OEI to allow for a two-chip solution for larger switching matrices with OEI (output enable indication) pins. Bit position 13 (OEPOL) designates the polarity of each pin that is disposed in an OEI mode. When OEPOL=1, then a high on an OEI pin denotes an active state on the output data stream and a low on an OEI pin denotes a high-impedance state. When OEPOL=0, then a high on an OEI pin denotes a high-impedance state and a low on an OEI pin denotes an active state. Bit position 14 (BYP) controls the bypass mode, as described more fully above. When BYP=1, all RX input streams received by the input buffer 26 are "shorted" by the serial bypass bus 52 to corresponding TX output streams. However, when BYP=0, normal mode is present and the serial bypass bus 52 is inactive. Bit position 15 (SRS) provides software reset capability. When SRS=1, the TSI switch 10 will be reset in the same manner achieved by driving the pin /RESET low.

Accordingly, TSI switches according to embodiments of the present invention include control circuitry therein that is configured to operate in user selectable burst program and bypass modes of operation to improve programming and testing/debugging efficiency. During the burst program mode of operation, a "group" block of entries within a group of the connection memory is automatically programmed with equivalent switching modes. In alternative embodiments, multiple blocks may be programmed with equivalent or different switching modes. The burst program mode of operation may also include operations to reset the addresses retained by connection memory (e.g., when RCML=1 at the time BPE switches low-to-high). These reset operations may also occur during full block programming when the switch is inactive or when the switch is active but the output data is not being treated as valid.

Figure 6A:
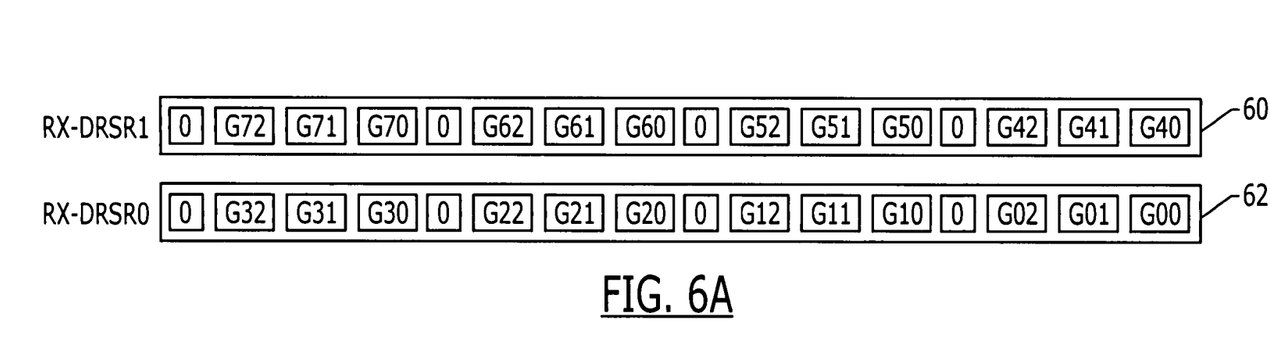
FIG. 6A illustrates a pair of receive data rate selection registers (RX-DRSR) within the TSI switch of FIG. 4.
Figure 6B:
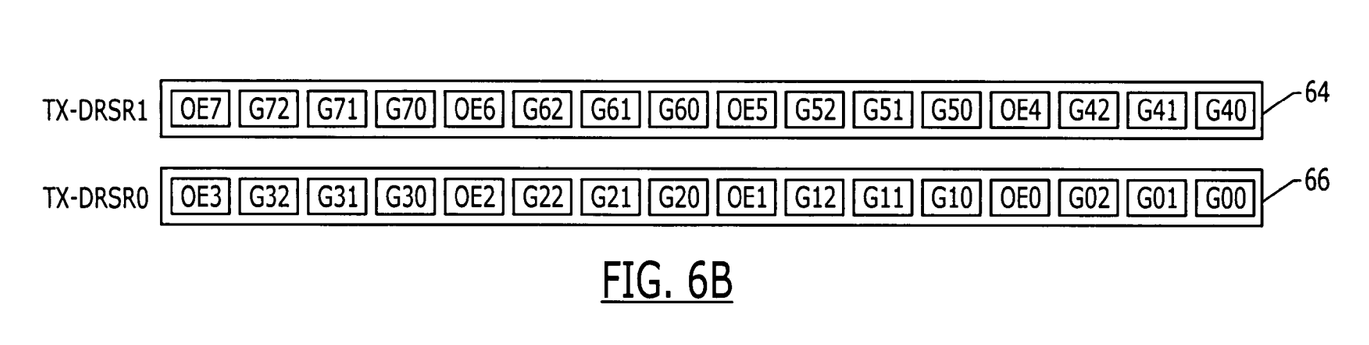
FIG. 6B illustrates a pair of transmit data rate selection registers (TX-DRSR) within the TSI switch of FIG. 4.
Figure 6C:
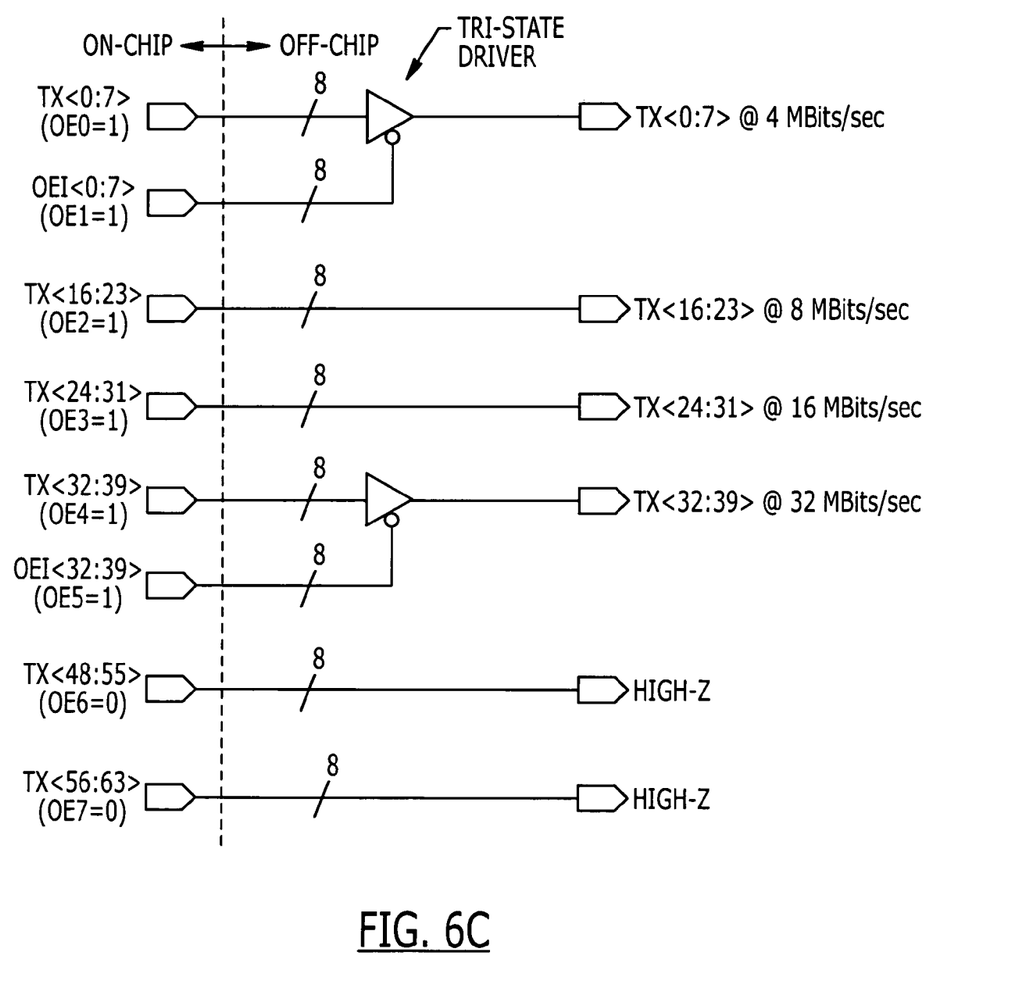
FIG. 6C illustrates the operating states of the serial output data streams (TX0-TX63) based on the transmit data rate selection register contents illustrated by TABLE 4.

Referring now to FIGS. 6A-6C, the control circuit 12 and command logic 16 therein generate control signals that are provided to the input buffer 26 and the output buffer/driver 28. These control signals are generated in response to data that is derived from the receive data rate selection registers 60 and 62 and the transmit data rate selection registers 64 and 66. In FIG. 6A, the receive data rate selection registers 60 and 62 (RX-DRSR1 and RX-DRSR0) are illustrated as containing three bits of data Gn2-Gn0 (n=0-7) for each of the eight illustrated groups of serial input data streams (RX0-7 (Group n=0) through RX56-63 (Group n=7)). The receive data rate selection registers 60 and 62 are also illustrated as including eight (8) unused storage elements that are preset to logic 0 levels. As illustrated by FIG. 4 and TABLE 2, the command logic 16 operates to control the input buffer 26 (and serial-to-parallel converter 32) so that each group of serial input data streams RX0-7 through RX56-63 can be clocked in and processed at data rates ranging from 2 Mbits/sec to 32 Mbits/sec. In the event the bits Gn2-Gn0 are set to one of the reserved values specified by TABLE 2, the respective group of serial input streams will be processed at a default rate of 2 Mbits/sec.

TABLE 2

| Gn2 | Gn1 | Gn0 | Data Rate |
|---|---|---|---|
| 0 | 0 | 0 | 2 Mbits/sec |
| 0 | 0 | 1 | 4 Mbits/sec |
| 0 | 1 | 0 | 8 Mbits/sec |
| 0 | 1 | 1 | 16 Mbits/sec |
| 1 | 0 | 0 | 32 Mbits/sec |
| 1 | 0 | 1 | Reserved |
| 1 | 1 | 0 | Reserved |
| 1 | 1 | 1 | Reserved |

In FIG. 6B, the transmit data rate selection registers 64 and 66 (TX-DRSR1 and TX-DRSR0) are illustrated as containing four bits of data OEn and Gn2-Gn0 (n=0-7) for each of the eight illustrated groups of serial output data streams (TX0-7 (Group n=0) through TX56-63 (Group n=7)). Each of the odd groups of serial output data streams (where n=1,3,5 and 7) can be selectively disposed in an output enable indication mode of operation using the bits Gn2-Gn0. The bits OEn also provide output enable control on a group-by-group basis.

In particular, the odd output group TX8-15 (OEI0-7) can provide output enable indication for the even output group TX0-7 and the output group TX24-31 (OEI16-23) can provide output enable indication for the even output group TX16-23. Similarly, the odd output group TX40-47 (OEI32-39) can provide output enable indication for the even output group TX32-39 and the output group TX56-63 (OEI48-55) can provide output enable indication for the even output group TX48-55.

As illustrated by FIG. 4 and TABLE 3, the command logic 16 operates to control the output buffer/driver 28 (and parallel-to-serial converter 38) so that each group of serial output data streams TX0-7 through TX56-63 can be clocked out at data rates ranging from 2 Mbits/sec to 32 Mbits/sec. Moreover, each of the odd groups of serial output data streams may be programmed to operate in the output enable indication (OEI) mode when the bits Gn2-Gn0 for the respective odd group are set to (111). Bit 13 (OEPOL) of the control register 48 determines whether a logic 0 or logic 1 value at an OEI output represents an active state or high-impedance state, as described above.

TABLE 3

| Gn2 | Gn1 | Gn0 | Data Rate |
|---|---|---|---|
| 0 | 0 | 0 | 2 Mbits/sec |
| 0 | 0 | 1 | 4 Mbits/sec |
| 0 | 1 | 0 | 8 Mbits/sec |
| 0 | 1 | 1 | 16 Mbits/sec |
| 1 | 0 | 0 | 32 Mbits/sec |
| 1 | 0 | 1 | Reserved |
| 1 | 1 | 0 | Reserved |
| 1 | 1 | 1 | OEI (ODD TX GROUPS) |

As an example, one possible configuration of the serial output data streams (TX0-TX63) that may be provided by the control circuit 12 is illustrated by FIG. 6C and TABLE 4 (where X=don't care). In particular, TABLE 4 illustrates the values of the data stored in the transmit data rate selection registers 64 and 66 (TX-DRSR1 and TX-DRSR0). This data results in the particular configuration of the serial output data streams TX0-TX63 illustrated by FIG. 6C. In FIG. 6C, even output group 0 (TX0-TX7) is shown as operating at a data rate of 4 Mbits/sec and the odd output group 1 (TX8-15/OEI0-7) is shown as being set in an OEI mode that is rate matched with the odd group 0. Even output group 2 (TX16-TX23) and odd output group 3 (TX24-31) are shown as operating at 8 Mbits/sec and 16 Mbits/sec, respectively. Even output group 4 (TX32-TX39) is shown as operating at a data rate of 32 Mbits/sec and the odd output group 5 (TX40-47/OEI32-39) is shown as being set in an OEI mode that is rate matched with the odd group 4. Even output group 6 (TX48-TX55) and odd output group 7 (TX56-63) are shown as operating in high-Z modes because bits OE6 and OE7 in the transmit data rate selection register 64 are both set to logic 0 values (when OEn=1, the respective group is active).

TABLE 4

| STREAMS | OEn (n = 0, . . . , 7) | Gn2 | Gn1 | Gn0 |
|---|---|---|---|---|
| TX0-TX7 | OE0 = 1 | G02 = 0 | G01 = 0 | G00 = 1 |
| TX8-TX15 | OE1 = 1 | G12 = 1 | G11 = 1 | G10 = 1 |
| TX16-TX23 | OE2 = 1 | G22 = 0 | G21 = 1 | G20 = 0 |
| TX24-TX31 | OE3 = 1 | G32 = 0 | G31 = 1 | G30 = 1 |
| TX32-TX39 | OE4 = 1 | G42 = 1 | G41 = 0 | G40 = 0 |
| TX40-TX47 | OE5 = 1 | G52 = 1 | G51 = 1 | G50 = 1 |
| TX48-TX55 | OE6 = 0 | G62 = X | G61 = X | G60 = X |
| TX56-TX63 | OE7 = 0 | G72 = X | G71 = X | G70 = X |

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A time-slot interchange switch, comprising:
an input buffer configured to receive at least first and second groups of serial input data streams;
an output driver configured to generate at least first and second groups of serial output data streams; and
a control circuit electrically coupled to said output driver, said control circuit configured to provide programmable group-based output drive enable control to the at least first and second groups of serial output data streams that is independent of per-channel output stream programming.

2. The switch of claim 1, wherein said control circuit comprises:
a transmit data rate selection register configured to retain output drive enable data that specifies which ones of the at least first and second groups of serial output data streams are disposed in high-Z states and which other ones are disposed in low-Z (active) states when the switch is active.

3. A time-slot interchange switch, comprising:
an input buffer that is configured to receive at least first and second groups of serial input data streams;
an output driver that is configured to generate at least first and second groups of serial output data streams; and
a control circuit that is configured to support processing of the first and second groups of serial input data streams at different receive data rates and is further configured to support processing of the first and second groups of serial output data streams at different transmit data rates, said control circuit comprising at least one transmit data rate selection register that is configured to retain data that specifies the transmit data rates on a group-by-group basis and at least one receive data rate selection register that is configured to retain data that specifies the receive data rates on a group-by-group basis.

4. A time-slot interchange switch, comprising:
an input buffer that is configured to receive at least first through fourth equal-sized groups of serial input data streams;
an output driver that is configured to generate at least first through fourth equal-sized groups of serial output data streams; and
a control circuit that is configured to support processing of the first through third groups of serial output data streams at different transmit data rates and is further configured to support operation of the fourth group of serial output data streams in an output enable indication mode that is matched in frequency to the transmit data rate of a corresponding one of the first through third groups of serial output data streams.

5. A time-slot interchange switch, comprising:
an input buffer that is configured to receive at least first and second groups of serial input data streams;
an output driver that is configured to generate at least first and second groups of serial output data streams; and
a control circuit that is electrically coupled to said output driver and configured to provide programmable group-based output drive enable control to the at least first and second groups of serial output data streams, said control circuit comprising a transmit data rate selection register that is configured to retain output drive enable data that specifies which ones of the at least first and second groups of serial output data streams are disposed in high-Z states and which other ones are disposed in low-Z (active) states when the switch is active.

6. The switch of claim 5, further comprising:
a data memory having first entries therein that comprise data received by the switch; and
a connection memory having second entries therein that comprise addresses of a plurality of the first entries and switching modes assigned to the plurality of the first entries; and
wherein said control circuit is further configured to automatically program a block of the second entries with updated switching modes during a burst program mode of operation that occurs when the switch is actively processing serial data streams in a manner that preserves data validity.

7. The switch of claim 6, wherein the switch is also configured to internally support serial input-to-output bypass of said data memory when disposed in a bypass mode of operation.

* * * * *